United States Patent [19]

Bialous et al.

[11] 4,391,935

[45] Jul. 5, 1983

[54] FLAME RETARDANT POLYCARBONATE COMPOSITION

[75] Inventors: Charles A. Bialous, Evansville; John B. Luce, Mt. Vernon; Victor Mark, Evansville, all of Ind.

[73] Assignee: General Electric Company, Mt. Vernon, Ind.

[21] Appl. No.: 260,300

[22] Filed: May 4, 1981

Related U.S. Application Data

[63] Continuation of Ser. No. 949,964, Oct. 10, 1978, abandoned, which is a continuation of Ser. No. 496,128, Aug. 9, 1974, abandoned.

[51] Int. Cl.$^3$ .............................................. C08K 5/45
[52] U.S. Cl. ...................................... 524/82; 524/84; 524/89; 524/108; 524/159; 524/160; 524/162; 524/164; 524/165; 524/209; 524/358; 524/395; 525/132; 525/133; 525/146; 525/151; 525/535

[58] Field of Search ............... 525/132, 146, 151, 535; 524/82, 84, 89, 108, 159, 160, 162, 164, 165, 209, 358, 395

[56] References Cited

U.S. PATENT DOCUMENTS

| | | | |
|---|---|---|---|
| 3,005,795 | 10/1961 | Busse et al. ......................... | 525/148 |
| 3,651,174 | 3/1972 | Bialous ................................ | 525/146 |
| 3,671,487 | 6/1972 | Abolins ............................... | 525/146 |
| 3,673,278 | 6/1972 | Bialous ................................ | 525/148 |

*Primary Examiner*—J. Ziegler
*Attorney, Agent, or Firm*—Martin B. Barancik

[57] ABSTRACT

An improved flame retardant polycarbonate composition of an aromatic carbonate polymer in admixture with an organic alkali metal salt or an organic alkaline earth metal salt or mixtures thereof, which composition has in admixture therewith a fluorinated polyolefin.

3 Claims, No Drawings

FLAME RETARDANT POLYCARBONATE COMPOSITION

This is a continuation of copending application Ser. No. 949,964, filed Oct. 10, 1978, which is a continuation of Ser. No. 496,128, filed Aug. 9, 1974, both now abandoned.

This invention is directed to an improved flame retardant polycarbonate composition of an aromatic carbonate polymer in admixture with an organic alkali metal salt or an organic alkaline earth metal salt or mixtures thereof, the improvement which comprises having in admixture with the polycarbonate a fluorinated polyolefin in sufficient quantity to render the polycarbonate composition non-dripping.

BACKGROUND OF THE INVENTION

In the art, there are many flame retardant additives which are employed by mixing with polycarbonate to render such materials self-extinguishing or flame retardant. Such flame retardant additives are employed in varying amounts in order to be effective in extinguishing burning of those products which are combustible.

However, even if the polycarbonate does not burn, in flame, it may drip hot particles which can ignite material below it.

DESCRIPTION OF THE INVENTION

It has been surprisingly discovered that an aromatic polycarbonate made flame retardant by incorporating with the aromatic polycarbonate organic alkali metal salts or organic alkaline earth metal salts or mixtures thereof can be rendered non-dripping by admixing the flame retardant polycarbonate with a fluorinated polyolefin.

The fluorinated polyolefins used in this invention as drip retarding agents are commercially available or can be prepared by known processes. They are white solids obtained by polymerization of tetrafluoroethylene, for example, in aqueous media with free radical catalysts, e.g., sodium, potassium or ammonium peroxydisulfates at 100 to 1,000 psi at 0°–200° C. and preferably at 20°–100° C. See Brubaker, U.S. Pat. No. 2,393,967. While not essential, it is preferred to use the resins in the form of relatively large particles, e.g., of average size 0.3 to 0.7 mm, mostly 0.5 mm. These are better than the usual polytetrafluoroethylene powders which have particles of from 0.05 to 0.5 millimicrons in diameter. It is especially preferred to use the relatively large particle size material because it tends to disperse readily in polymers and bond them together into fibrous materials. Such preferred polytetrafluoroethylenes are designated by ASTM as Type 3, and are available commercially from the E. I. DuPont de Nemour and Company (TEFLON Type 6).

The amount of the fluorinated polyolefin to be used can vary widely but usually will be from about 0.01 to about 2.0 weight percent based on total weight of the resin.

The composition of the instant invention may also include fibrous glass as described in copending application (A) of Charles A. Bialous, John B. Luce and Victor Mark Ser. No. 496,127 filed concurrently herewith and assigned to the same assignee as the present invention. Also, the composition of the instant invention may include the siloxanes described in copending application (B) of Charles A. Bialous, John B. Luce and Victor Mark Ser. No. 496,115, now U.S. Pat. No. 3,971,756 filed concurrently herewith and assigned to the same assignee as the present invention. Application A and B are incorporated herein by reference. Further, the instant composition can include both fibrous glass and siloxanes.

The organic alkali metal and alkaline metal salts employed herein are fully described in the following applications:

Application (A) of Victor Mark and Thomas J. Noogeboom, Ser. No. 429,643 filed Dec. 28, 1973, now U.S. Pat. No. 3,933,734, titled A Flame Retardant Polycarbonate Composition.

This application discloses a flame retardant polycarbonate composition comprising in admixture an aromatic carbonate polymer and a flame retardant additive which may be the metal salts of either monomeric or polymeric aromatic sulfonic acids, or mixture thereof.

Application (B) of Victor Mark, Ser. No. 429,121 filed Dec. 28, 1973, now U.S. Pat. No. 3,948,851, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of either monomeric or polymeric aromatic sulfonesulfonic acids, or mixtures thereof.

Application (C) of Victor Mark, Ser. No. 429,642 filed Dec. 28, 1973, now U.S. Pat. No. 3,926,908, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of sulfonic acids of aromatic ketones, or mixtures thereof.

Application (D) of Victor Mark, Ser. No. 429,166 filed Dec. 28, 1973, now U.S. Pat. No. 3,919,167, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of heterocyclic sulfonic acids, or mixtures thereof.

Application (E) of Victor Mark, Ser. No. 429,125 filed Dec. 28, 1973, now U.S. Pat. No. 4,153,595, titled A Flame Retardant Polycarbonate Composition and assigned to the same assignee as the present invention. This application discloses a flame retardant polycarbonate composition comprising in admixture an aromatic carbonate polymer and a flame retardant additive which may be the alkali metal salts of halogenated methanesulfonic acids or mixtures thereof, or mixtures of the alkali metal salts and the alkali earth metal salts.

Application (F) of Victor Mark, Ser. No. 429,644 filed Dec. 28, 1973, now U.S. Pat. No. 4,066,618, titled A Flame Retardant Polycarbonate Composition and assigned to the same assignee as the present invention. This application discloses a flame retardant polycarbonate composition comprising in admixture an aromatic carbonate polymer and a flame retardant additive which may be metal salts of a halogenated non-aromatic carboxylic acid or mixtures thereof.

Application (G) of Victor Mark, Ser. No. 429,163 filed Dec. 28, 1973, now U.S. Pat. No. 3,909,490, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of sulfonic acids of aromatic sulfides, or mixtures thereof.

Application (H) of Victor Mark, Ser. No. 429,128 filed Dec. 28, 1973, now U.S. Pat. No. 3,953,396, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of either monomer or polymeric aromatic ether sulfonic acids, or mixtures thereof.

Application (I) of Victor Mark, Ser. No. 429,645 filed Dec. 28, 1973, now U.S. Pat. No. 3,931,100, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of aliphatic and olefinic sulfonic acids, and mixtures thereof.

Application (J) of Victor Mark, Ser. No. 429,126 filed Dec. 28, 1973, now U.S. Pat. No. 3,978,024, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of either monomeric or polymeric phenol ester sulfonic acids, or mixtures thereof.

Application (K) of Victor Mark, Ser. No. 429,164 filed Dec. 28, 1973, now U.S. Pat. No. 4,069,201, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of unsubstituted or halogenated oxocarbon acids, or mixtures of thereof.

Application (L) of Victor Mark, Ser. No. 429,127 filed Dec. 28, 1973, now U.S. Pat. No. 3,953,399, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of sulfonic acids of monomeric and polymeric aromatic carboxylic acids and esters, and mixtures thereof.

Application (M) of Victor Mark, Ser. No. 429,165 filed Dec. 28, 1973, now U.S. Pat. No. 3,917,559, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of halocycloaliphatic aromatic sulfonic acids.

Application (N) of Victor Mark, Ser. No. 429,646 filed Dec. 28, 1973, now U.S. Pat. No. 3,957,910, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of either monomeric or polymeric aromatic amide sulfonic acids, or mixtures thereof.

Application (O) of Victor Mark, Ser. No. 429,120 filed Dec. 28, 1973, now U.S. Pat. No. 3,940,366, titled A Flame Retardant Polycarbonate Composition and assigned to the same assignee as the present invention. This application discloses a flame retardant polycarbonate composition comprising in admixture an aromatic carbonate polymer and a flame retardant additive which may be the metal salts of either monomeric or polymeric aromatic sulfonic acids, or mixtures thereof.

Applications A through O are incorporated herein by reference. The metal salts of any of these applications as as well as mixtures of any of the metal salts of any of the applications may be used.

Preferred salts include sodium 2,4,5-trichlorobenzenesulfonate; sodium benzenesulfonate; disodium naphthalene-2,6-disulfonate; sodium p-iodobenzenesulfonate; sodium 4,4'-dibromobiphenyl-3-sulfonate; sodium 2,3,4,5,6-pentachloro-betastyrenesulfonate; sodium 4,4'-dichlorodiphenylsulfide-3-sulfonate; disodium tetrachlorodiphenyletherdisulfonate; disodium 4,4'-dichlorobenzophenone-3,3'-disulfonate; sodium 2,5-dichlorothiophene-3-sulfonate; sodium salt of diphenylsulfone-3-sulfonic acid; sodium dimethyl 2,4,6-trichloro-5-sulfoisophthalate; potassium salt of the sulfonic acid of dichlorophenyl 2,4,5-trichlorobenzene sulfonate; calcium salt of 2,4,5-trichlorobenzenesulfonamilide-4'-sulfonate; sodium 4'[1,4,5,6,7,7-hexachlorobicyclo-[2.2.1]-hept-5-en-ando-2-yl]-benzenesulfonate; disodium hexafluoroglutarate; disodium chloranilate; and mixtures. These salts are used in amount of from 0.01 to about 10 weight percent based on the weight of the aromatic carbonate polymer composition.

The aromatic carbonate polymers employed in the practice of this invention are homopolymers and copolymers that are prepared by reacting a dihydric phenol with a carbonate precursor. The dihydric phenols that can be employed are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2-2-bis-(4-hydroxy-3,5-dichlorophenyl) propane, 2,2-bis(4-hydroxy-3,5-dibromophenyl) propane, etc., dihydric phenol ethers such as bis(4-hydroxyphenyl) ether, bis(3,5-dichloro-4-hydroxyphenyl) ether, etc.; dihydroxydiphenyls such as p,p'-dihydroxydiphenyl, 3,3'dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available to provide carbonate polymers and are disclosed in U.S. Pat. Nos. 2,999,835; 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, etc. It is of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-chlorophenyl) carbonate, di-(bromophenyl) carbonate, di-(trichlorophenyl) carbonate, di(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl, glycol, polyethylene glycol, etc.). While other carbonate precursors will occur to those skilled in the art, carbonyl chloride also known as phosgene is preferred.

Also included are the polymeric materials of a dihydric phenol, a dicarboxylic acid and carbonic acid. These are disclosed in U.S. Pat. No. 3,169,121 which is incorporated herein by reference.

The aromatic carbonate polymers of this invention are prepared by employing a molecular weight regulator, an acid acceptor and a catalyst. The molecular weight regulators which may be employed in carrying out the process of this invention include phenol, cyclohexanol, methanol, para-tertiarybutylphenol, para-bromophenol, etc. Preferably phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkali earth metal.

Obviously other materials can also be employed with the aromatic carbonate polymer of this invention and include such materials as anti-static agents, pigments, mold release agents, thermal stabilizers, ultraviolet light stabilizers, reinforcing fillers and the like.

The composition of this invention is prepared by admixing the aromatic carbonate polymer with the organic alkali metal or alkaline earth metal salts and the fluorinated polyolefin.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE I

A polycarbonate composition is prepared by extruding a homopolymer of 2,2-bis(4-hydroxyphenyl)propane (hereinafter referred to as bisphenol-A) prepared by reacting essentially equimolar amounts of bisphenol-A and phosgene in an organic medium with triethylamine, sodium hydroxide, and phenol, under standard conditions. The resulting polymer is then fed to an extruder, which extruder is operated at about 265° C., and the extrudate is comminuted into pellets.

The pellets are then injection molded at about 315° C. into test bars of about 5 in. by ½ in. by about 1/16-⅛ in. thick. The test bars (5 for each additive listed in the Table) are subjected to the test procedure set forth in Underwriters' Laboratories, Inc. Bulletin 94, Burning Test for Classifying Materials (hereinafter referred to as UL-94). In accordance with this test procedure, materials so investigated are rated either UL-94 V-O, UL-94 V-I, UL-94 V-II, based on the results of 5 specimens. The criteria for each V rating per UL-94 is briefly as follows:

"UL-94 V-O": Average flaming and/or glowing after removal of the igniting flame shall not exceed 5 seconds, and none of the specimens shall drip particles which ignite absorbent cotton.

"UL-94 V-I": Average flaming and/or glowing after removal of the igniting flame shall not exceed 25 seconds and one of the specimens shall drip particles which ignite absorbent cotton.

"UL-94 V-II: Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burning". Further, UL-94 requires that all test bars must need the V type rating to achieve the particular rating. Otherwise, the 5 bars receive the rating of the worst single bar. For example, if one bar is classified as UL-94 V-II and the other four (4) are classified as UL-94 V-O, then the rating for all 5 bars is UL-94 V-II.

The results are shown in the Table.

EXAMPLE II

To the polycarbonate of Example I is added 0.5 parts of sodium 2,4,5-trichlorobenzenesulfonate. The mixture is extruded, molded, and tested in the same manner as described in Example I.

EXAMPLE III

To the polycarbonate of Example I is added 0.5 parts of sodium 2,4,5-trichlorobenzenesulfonate and 0.05 parts of poly(tetrafluoroethylene), (sold by E. I. DuPont deNemours and Company as TEFLON-6). The mixture is extruded, molded and tested in the same manner as described in Example I.

The remaining compositions are prepared by the methods of Examples I to III.

TABLE

| Example | Salt Additive | Parts | Fluorinated Polyolefin | Parts | Flame Out Time Seconds (Avg.) | No. of Drips Per Five Bars | Rating |
|---|---|---|---|---|---|---|---|
| I | — | | — | | 13.4 | 10 | Burning |

TABLE-continued

| Example | Salt Additive | Parts | Fluorinated Polyolefin | Parts | Flame Out Time Seconds (Avg.) | No. of Drips Per Five Bars | Rating |
|---|---|---|---|---|---|---|---|
| II | Sodium 2,4,5-trichlorobenzene sulfonate | 0.5 | — | | 3.4 | 0 | UL-94 V-II |
| III | Sodium 2,4,5-trichlorobenzene sulfonate | 0.5 | Teflon-6 | 0.05 | 2.0 | 0 | UL-94 V-O |
| IV | Sodium benzenesulfonate | 1.0 | Teflon-6 | 0.1 | 5.0 | 0 | UL-94 V-O |
| V | Disodium naphthalene-2,6-disulfonate | 1.0 | Teflon-6 | 0.1 | 4.9 | 0 | UL-94 V-O |
| VI | Disodium tetrachlorodiphenyletherdisulfonate | 0.5 | — | | 4.4 | 2 | UL-94 V-II |
| VII | Disodium tetrachlorodiphenyletherdisulfonate | 0.5 | Teflon-6 | 0.1 | 3.2 | 0 | UL-94 V-O |
| VIII | Sodium 2,3,4,5,6-pentachloro-betastyrenesulfonate | 0.5 | Teflon-6 | 0.1 | 3.0 | 0 | UL-94 V-O |
| IX | Sodium 4,4'-dichlorodiphenylsulfide-3-sulfonate | 0.5 | Teflon-6 | 0.1 | 3.9 | 0 | UL-94 V-O |
| X | Disodium 4,4'-dichlorobenzophenone-3,3'-disulfonate | 0.5 | Teflon-6 | 0.05 | 4.2 | 0 | UL-94 V-O |
| XI | Sodium 2,5-dichlorothiophene-3-sulfonate | 0.3 | Teflon-6 | 0.05 | 2.8 | 0 | UL-94 V-O |
| XII | Sodium diphenylsulfone-3-sulfonate | 0.4 | Teflon-6 | 0.1 | 3.2 | 0 | UL-94 V-O |
| XIII | Sodium dimethyl 2,4,6-trichloro-5-sulfoisophthalate | 1.0 | Teflon-6 | 0.05 | 3.0 | 0 | UL-94 V-O |
| XIV | Potassium salt of the sulfonic acid of dichlorophenyl 2,4,5-trichlorobenzenesulfonate | 0.3 | Teflon-6 | 0.1 | 4.8 | 0 | UL-94 V-O |
| XV | Calcium 2,4,5-trichlorobenzenesulfonanilide-4'-sulfonate | 1.0 | Teflon-6 | 0.1 | 3.3 | 0 | UL-94 V-O |
| XVI | Sodium 4'[1,4,5,6,7,7-hexachlorobicyclo-[2.2.1]-hept-5-en-endo-2-yl]benzenesulfonate | 1.0 | Teflon-6 | 0.1 | 2.2 | 0 | UL-94 V-O |
| XVII | Disodium hexafluoroglutarate | 1.0 | Teflon-6 | 0.1 | 5.2 | 0 | UL-94 V-O |
| XVIII | Disodium chloranilate | 0.2 | Teflon-6 | 0.1 | 4.9 | 0 | UL-94 V-O |

As can be seen from the data in the Table, when the polycarbonate compositions contain the fluorinated polyolefin in addition to the flame retardant additives, the polycarbonate does not drip and is rated either UL-94 V-O, or UL-94 V-I.

Other flame retardant additives and fluorinated polyolefins can be substituted for those of the Table with similar results.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A composition meeting UL-94 $V_o$ requirements consisting essentially of (1) a non-halogenated aromatic polycarbonate, (2) a flame retardant effective amount of an alkali metal or alkaline earth metal salt of an organic acid of the group
   unsubstituted monomeric or polymeric aromatic sulfonic acids,
   monomeric or polymeric aromatic sulfonesulfonic acids,
   sulfonic acids of aromatic ketones,
   heterocyclic sulfonic acids,
   halogenated non-aromatic carboxylic acids,
   sulfonic acids of aromatic sulfides,
   monomeric or polymeric aromatic ether sulfonic acids,
   aliphatic and olefinic sulfonic acids,
   monomeric or polymeric phenol ester sulfonic acids,
   unsubstituted or halogenated oxocarbon acids,
   sulfonic acids of monomeric and polymeric aromatic carboxylic acids and esters,
   halocycloaliphatic aromatic sulfonic acids,
   monomeric or polymeric aromatic amide sulfonic acids,
   monomeric or polymeric aromatic sulfonic acids,
(3) and a non-dripping effective amount of an ASTM Type 3 polytetrafluoroethylene.

2. The composition in accordance with claim 1 wherein the polytetrafluoroethylene is present in an amount of from about 0.01 to about 2.0 weight percent based on the total weight of the polycarbonate composition.

3. The composition in accordance with claim 1 wherein the salt is sodium 2,4,5-trichlorobenzenesulfonate.

* * * * *

UNITED STATES PATENT AND TRADEMARK OFFICE
CERTIFICATE OF CORRECTION

PATENT NO. : 4,391,935
DATED : July 5, 1983
INVENTOR(S) : Charles A. Bialous, John B. Luce, and Victor Mark It is certified that error appears in the above-identified patent and that said Letters Patent are hereby corrected as shown below:

Table at columns 7 and 8 - Example II under heading

No. of Drips
        Per Five Bars 0                should be    8

Table at columns 7 and 8 - Example III under heading

Flame Out Time
        Seconds (Avg.)

2.0              should be    2.8

Signed and Sealed this

Tenth Day of September 1985

[SEAL]

Attest:

DONALD J. QUIGG

Attesting Officer     Acting Commissioner of Patents and Trademarks - Designate